United States Patent [19]
Rauch et al.

[11] 3,924,332
[45] Dec. 9, 1975

[54] INTRA-ORAL FUSION PROCESS

[76] Inventors: Marvin A. Rauch, 1223 Cornaga Ave., Far Rockaway, N.Y. 11691; Raymond L. Boni, 369 Barr Ave., Woodmere, N.Y. 11598; Thomas D. Hadnagy, 17 Briar Lane, Roslyn Heights, N.Y. 11577

[22] Filed: Aug. 29, 1973

[21] Appl. No.: 392,544

[52] U.S. Cl. ............................... 32/14 R; 32/14 A
[51] Int. Cl.² ......................................... A61C 7/00
[58] Field of Search ................ 32/14 R, 14 A, 14 F

[56] References Cited
UNITED STATES PATENTS

| | | | |
|---|---|---|---|
| 3,279,067 | 10/1966 | Hoffman | 32/1 |
| 3,745,653 | 7/1973 | Cohl | 32/14 A |

*Primary Examiner*—Louis L. Mancene
*Assistant Examiner*—J. Q. Lever, Jr.

[57] ABSTRACT

A process for performing intra-oral orthodontic practices including an electric fusion instrument that can be operated to weld inside the oral cavity.

4 Claims, 13 Drawing Figures

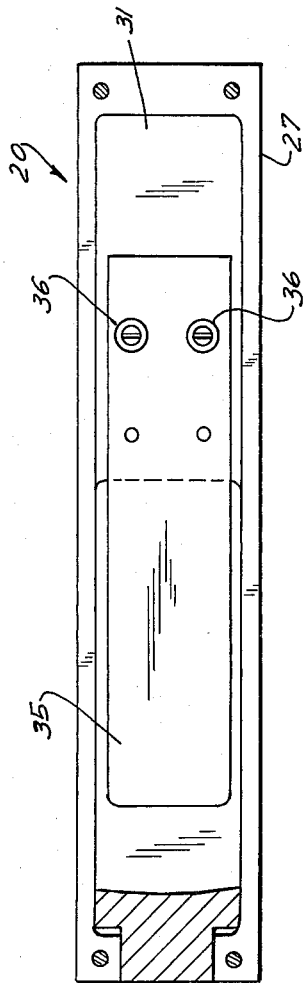
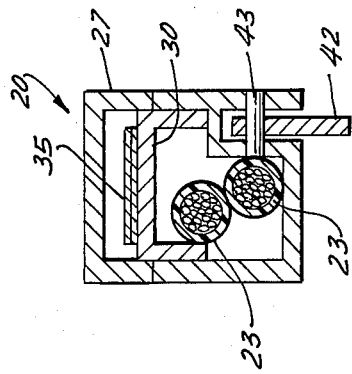
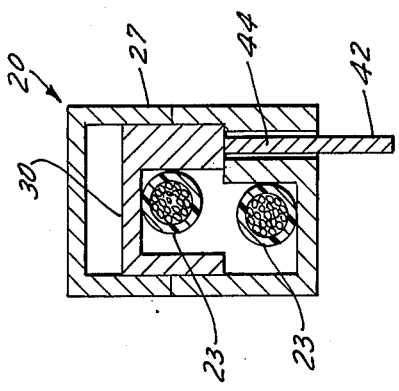
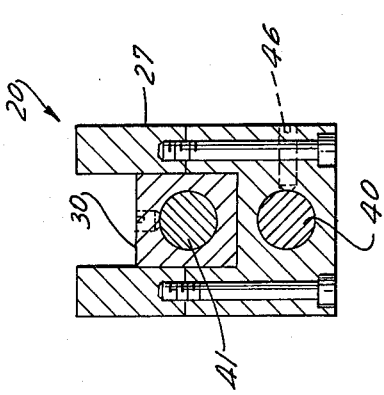

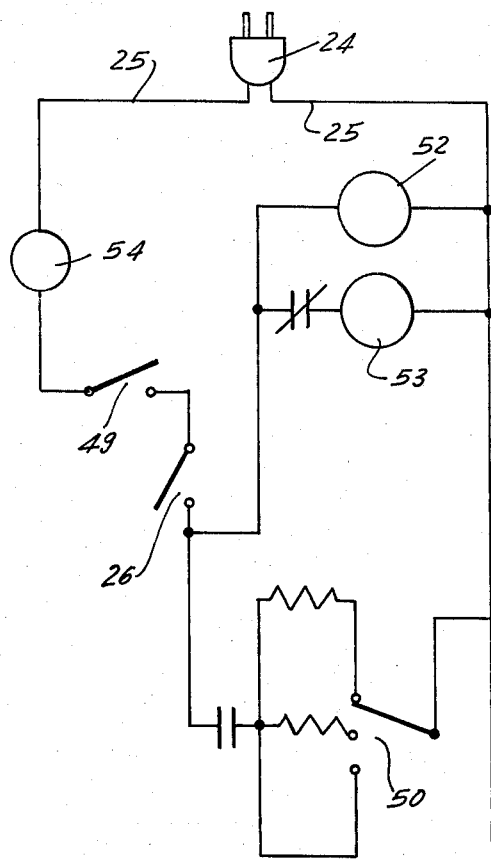
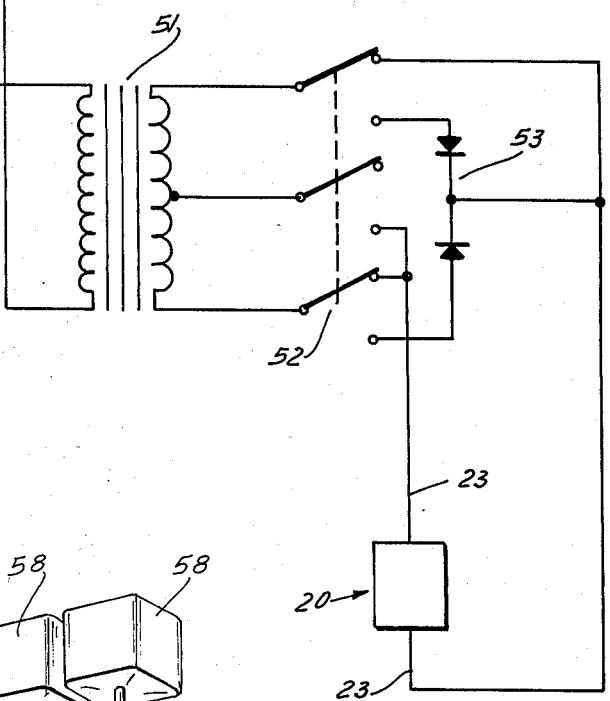
FIG.10
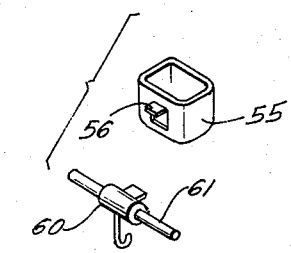
FIG.13
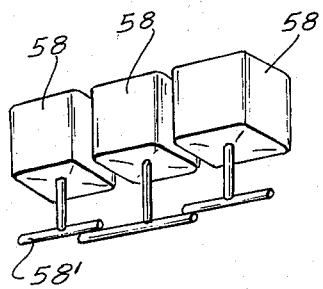
FIG.11
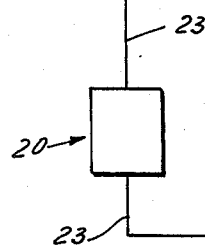
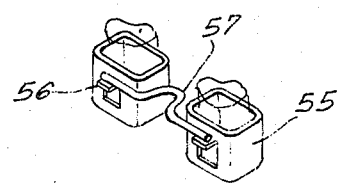
FIG.12

INTRA-ORAL FUSION PROCESS

BACKGROUND OF THE INVENTION

When a deciduous ("baby") tooth is lost prematurely it is necessary to prevent the adjacent teeth from moving together by providing a "space maintainer." The present procedures for providing such a space maintainer requires considerable time, laboratory work and expense. One of the methods employed is to fit bands to the teeth on either side of the space, take an impression with the bands in place, and pour a model, allowing it to set. This requires considerable time. After a model has set wires attached to the bands are soldered in place in the model, the appliance is removed from the model and the maintainer is cemented in place in the mouth. Another method of providing a space maintainer is to make cast crowns on each tooth on each side of the space and fit the crowns to the teeth in position. In order to do this an impression must be taken and a model made in the lab. The intervening wires are soldered on the false tooth and the space maintainer is cemented into place, again requiring considerable time.

Another typical time-consuming and expensive procedure is that of making a temporary bridge so that a patient will not have an "unsightly" space in the part of the mouth. In the present method this is accomplished by taking an impression of the area in which the work is to be performed and transmitting the impression to the laboratory. The work is completed in the laboratory and then cemented in the patient's mouth at the cost of considerable time and money.

In the making of braces in orthodontics the fabrication is a very complicated technique and a time-consuming process. An example of the savings in time achieved by the proposed technical innovation is the method of applying attachments to braces. In the method presently practiced a mark is made on a brace while it is in the patient's mouth to indicate the zone where the fitting is to be placed. The brace is then removed from the mouth and welded in the laboratory. This process must be repeated for each attachment. Removing and replacing an arch with wires to add a fitting to the brace that is already in the mouth requires considerable time. To make a new arch requires even a greater amount of time.

Thus it is evident that a simplified process and equipment to be used therewith would reduce the costs of the various orthodontic procedures, expand the application of new and more versatile attachments and allow these procedures to become available to a greater number of people.

Not only is this new technique time-saving and cost-reducing — but possibly of greater importance is its simplicity which offers the strong possibility of an orthodontic technique being mastered by all dentists and not just specialists. This new technique will thus change the practice to a preventative procedure available to all.

SUMMARY OF THE INVENTION

A process whereby preformed bands, caps, extensions and other dental materials are fitted and welded within the mouth of a patient through the use of a unique electric fusion instrument which can be operated by one hand within the mouth of the patient under control of a foot or manual switch.

DESCRIPTION OF THE DRAWINGS

FIG. 6 is a longitudinal partial section taken along the line 6—6 in the direction of the arrows in FIG. 3;

FIG. 7 is a transverse partially sectional view taken along the line 7—7 in the direction of the arrows in FIG. 2;

FIG. 8 is a transverse partially sectional view taken along the line 8—8 in the direction of the arrows in FIG. 2;

FIG. 9 is a transverse partially sectional view taken along the line 9—9 in the direction of the arrows in FIG. 2;

FIG. 10 is a schematic of the electrical circuitry used in the invention;

FIG. 11 is a perspective view of three caps of the type used in practicing our invention.

FIG. 12 is a perspective view of two teeth having caps thereon with a space between having a spacer bar therein; and FIG. 13 is an exploded perspective view of a band, buccal tube and arch wire.

DESCRIPTION OF THE PREFERRED EMBODIMENT

Figure 1:
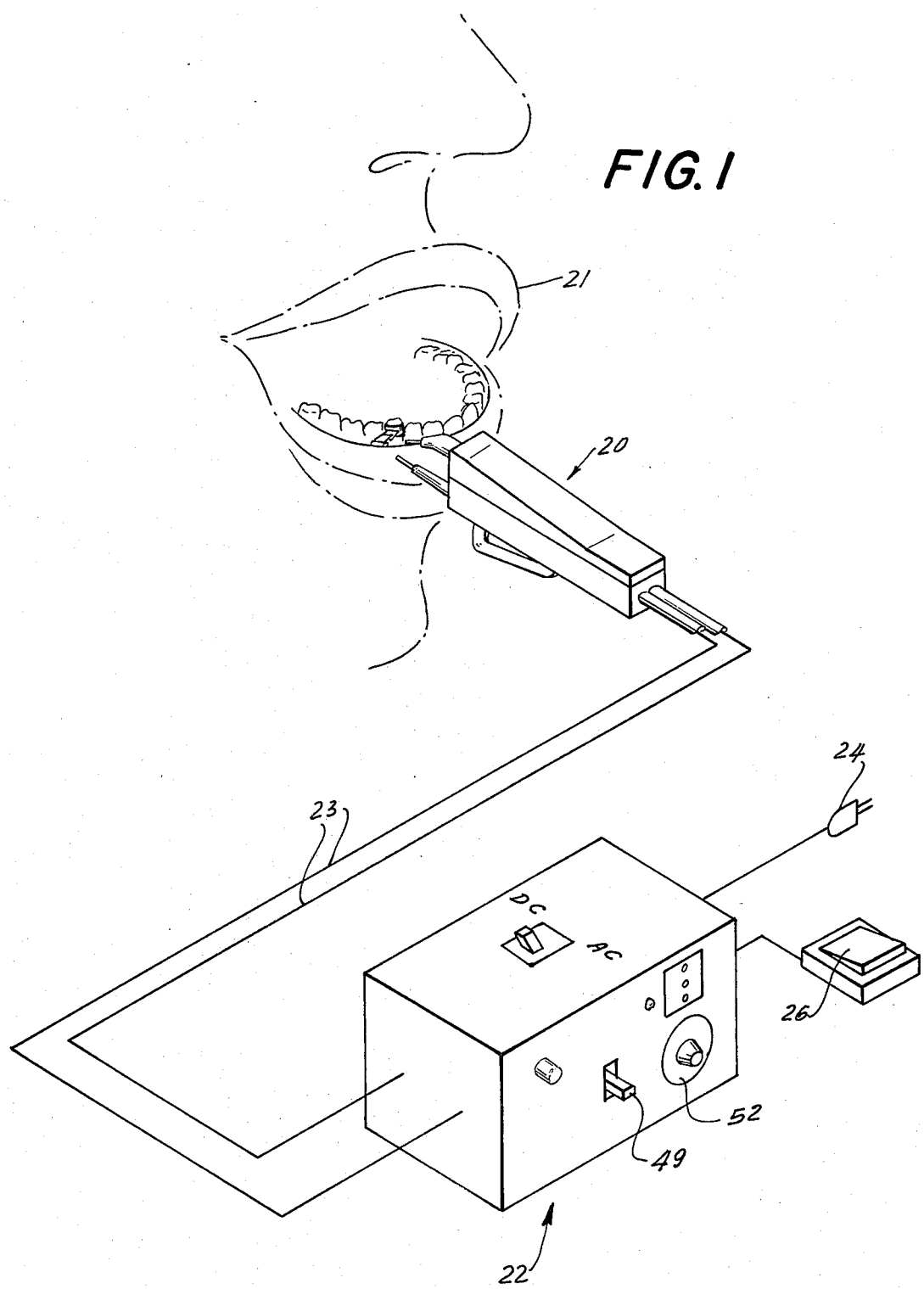
FIG. 1 is a diagrammatic view in perspective of our invention illustrating the fusion instrument and control box in use with respect to the teeth of a patient.

In FIG. 1 fusion instrument 20 constructed in accordance with the teachings of this invention is shown in use with a portion thereof within the mouth 21 of the patient under the control of control box 22 which is electrically connected to the fusion instrument by leads 23. Plug 24 and leads 25 are provided for connecting the control box to a 110 volt 60 cycle source. Foot switch 26 is connected to the box 22 in order to control the flow of power thereof.

The fusion instrument includes a hollow casing 27 which fixably supports electrode mount 28. Electrode mount 29 is attached to arm 30 which extends within bore 31 of the casing for pivotal attachment to the casing at 32. The casing 27 and arm 30 are formed of a non-electrically conducting material while electrode mounts 28 and 29 are formed of an electrically conducting material. Electrode mount 28 supports welding electrode 33 while electrode mount 29 supports welding electrode 34. Welding electrode 34 is normally yieldingly urged into contact with welding electrode 33 by the action of leaf spring 35 which is attached at one end to the casing by screw 36 and which is pressed through the major portion of its length against the arm 30 with the shoulder 37 of the casing forming a bend in the leaf spring to increase the force normally maintained against the arm 30.

The electrode mounts 28 and 29 are removably attached to the casing and arm 30 respectively by conducting members 38 and 39 respectively which project within hollowed out portions of the electrode amounts such as hollowed out portion 40 in mount 28 and hollowed out portion 41 in mount 29 to allow for mounting the electrode mounts and to transmit electricity thereto since conductor 38 forms an electrical terminal for one of the leads 23 while conductor 39 provides the electrical termination for the remainder of the leads 23.

Figure 3:
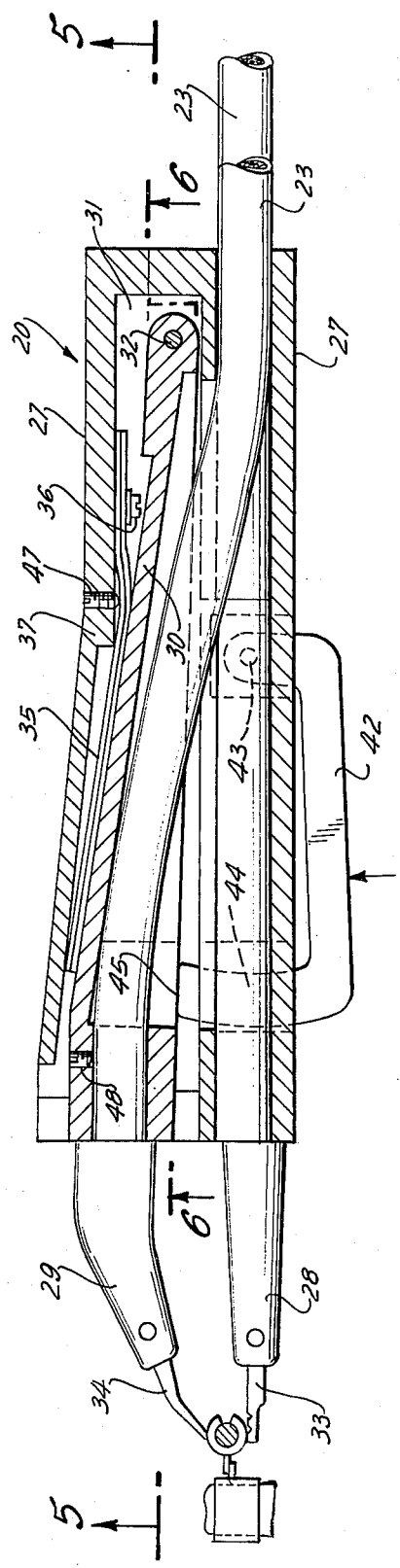
FIG. 3 is a partially sectional longitudinal view similar to the view of FIG. 2 with the instrument in open position during an intra-oral fusion operation.
Figure 5:
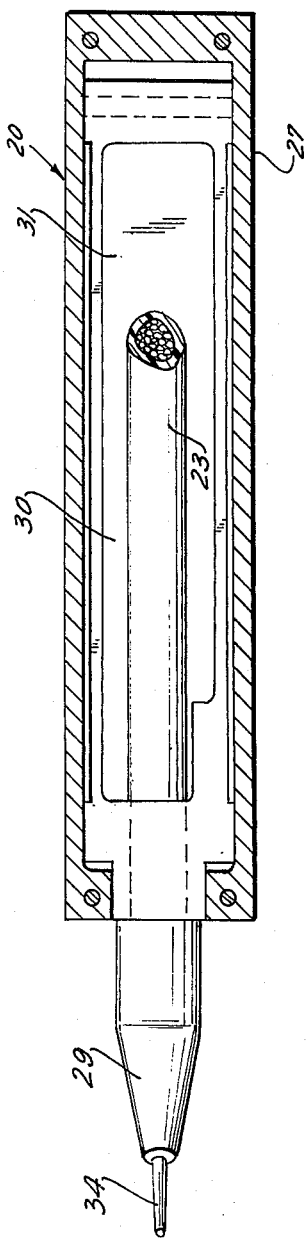
FIG. 5 is a longitudinal partial section taken along the line 5—5 in the direction of the arrows in FIG. 3.

A handle member 42 is pivotally attached at one end 43 to casing 27 with an end 44 thereof extending within the hollow bore of the casing for abutment at 45 with arm 30 so that movement of handle 42 in the direction of the arrow as seen in FIG. 3, for example, will cause the abutting surface 45 to press against arm 30 developing a force which overcomes the opposite force provided by leaf spring 35 thus separating the welding electrodes 33 and 34.

Figure 2:
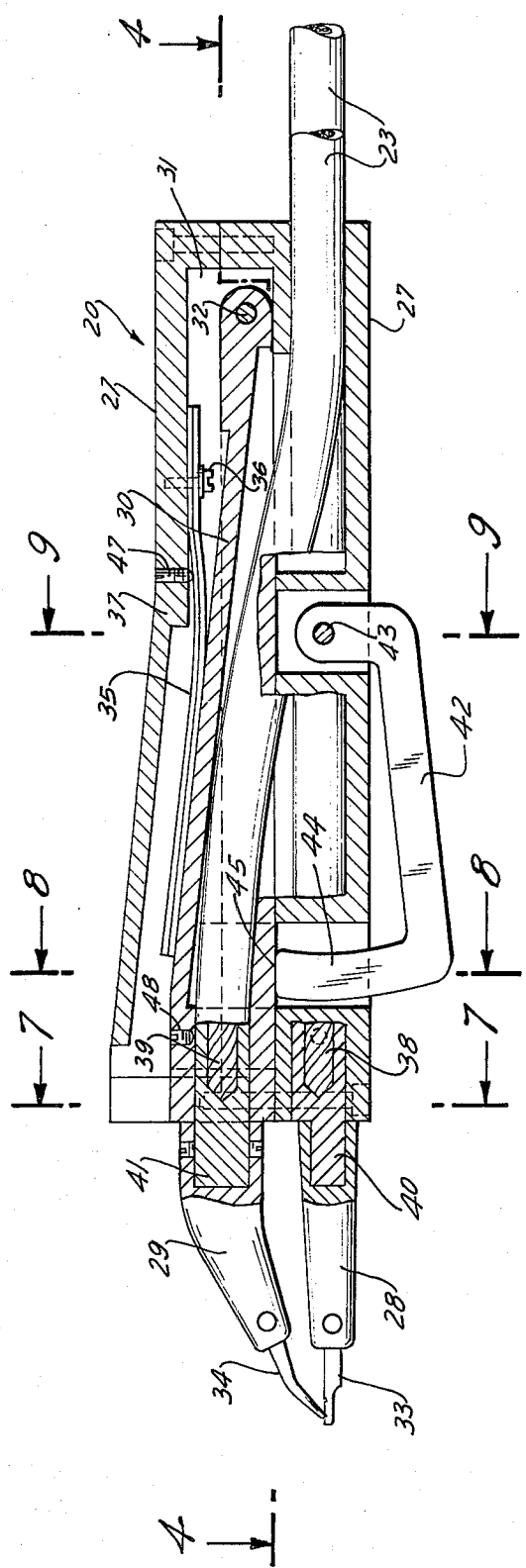
FIG. 2 is a partially sectional longitudinal view of the fusion instrument shown in FIG. 1 in closed position.
Figure 4:
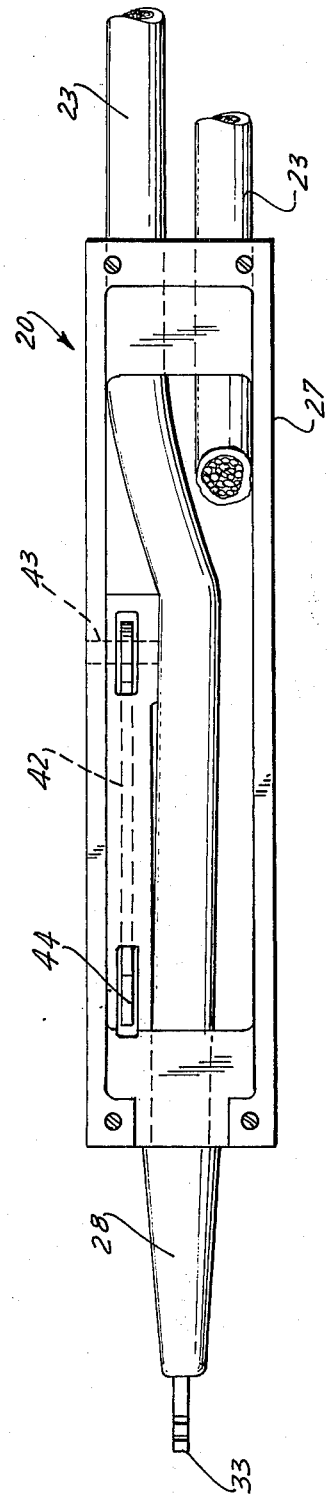
FIG. 4 is a longitudinal partial section taken along the line 4—4 in the direction of the arrows in FIG. 2.

In the Figs. it is noted in FIG. 2 that the welding electrodes 33 and 34 are in abutment whereas in FIG. 3 they are separated.

Various details are provided in the welding instrument 20 in order to make fine adjustments and allow it to be utilized in the process. Thus electrode mount 28 is made eccentric as seen in FIG. 7 so that upon loosening of fastening screw 46 and rotation of electrode mount 28 an adjustment can be made of the distance between the welding electrodes in the open position. Additional adjustment screw 47 is provided at shoulder 37 for adjusting the force of leaf spring 35 and thereby control the welding pressure. The screw 48 is utilized for fastening the electrode mount 29 to the arm or upper jaw 30.

The circuit for operation of the fusion instrument is shown in FIG. 10 and includes plug 24 and leads 25 to the control box 22, an on-off switch 49 in series with foot pedal 26 and a three-way plug 50 for attaching the plug 24 and foot pedal 26 together with on-off switch 49 into the circuit. This arrangement enables the operator to place a voltage on the primary of transformer 51 when the on-off switch and foot switch are closed at the same time. The voltage placed across the primary of transformer 51 is further under the control of timer 52 and control relay 53 so that the operator can by setting the timer determine the period of time in which the voltage will be applied to the primary of the transformer with respect to each operation of foot pedal 26. A three pole double throw switch 52 is provided at the secondary of transformer 51 to which is connected rectifier 53. Leads 23 connect the welding instrument 20 to the rectifier 53. A light 54 can be provided to indicate when the circuit is on. The three pole double throw switch 52 is provided so that AC or DC welding can be accomplished and in the position of the switch shown in FIG. 10 the circuit is arranged for Ac welding.

In one example of the process disclosed herein - where the deciduous tooth has been lost prematurely - the dentist would select two preformed stainless steel bands such as the band 55 in FIG. 12 (also shown in FIG. 13) and place these adjacent the space to be maintained. These bands have shelves 56 on the labial. A wire 57 in the shape of a "C" with extensions is then placed in position with the C in the space and one extension on the shelf of one adjacent band and the remaining extension on the shelf of the second adjacent band. The wire is then welded through utilization of the instrument disclosed herein to ledges on the bands and the connected space maintainer including the wire and bands are removed and then cemented into place.

In the example of the preparation of a temporary bridge so the patient will not have an unsightly space in a part of the mouth present procedures require several days laboratory time and considerable work and expense. In the present process preformed stainless steel caps with labial acrylic facings are provided and these are shown in FIG. 11 and indicated by the numeral 58. Each of the caps 58 shown in FIG. 11 has a "T" extension 58' from its incisal. The width of the extension extends past the margin of the cap in both directions. The cap is fitted to each tooth adjacent the space and a third cap is fitted in the space itself so that the extensions overlap. The overlapping extensions are squeezed or bent together until contacting each other and then fused in the mouth so that the three or more caps are connected in a proper position. The appliance can then be removed and the contact points between caps fused out of the mouth with the instrument and the extensions cut off and burred. The bridge is thereafter cemented on the supporting teeth.

As a further example in orthodontics a band of the type 55 in FIG. 12 is fitted and placed on the tooth and a buccal tube 60 is placed on the shelf of the band. The buccal tube is then welded in place to the band and an arch wire 61 placed in the tube. The arch wire is then properly positioned on the tooth bending the shelf in the process. The arch wire and the bands are then removed from the mouth. The bands with buccal tubes are then cemented to the supporting teeth in the normal procedure. However, the proper position has already been determined.

We claim:

1. An intra-oral process for preventing spaced first and second teeth from moving together in the mouth including the steps of selecting first and second bands each of which has a projecting shelf formed thereon and placing said bands on said first and second teeth respectively with said shelves projecting outwarly from the mouth, selecting a spacer member having a body and extensions thereon and placing said body in the space between said first and second teeth with respective extension thereof on respective shelves of said first and second bands, fusing the ends of said spacer member to said respective shelves while in the mouth, and thereafter cementing said first and second bands respectively to said first and second teeth.

2. An intra-oral process for the preparation of a bridge between first and second teeth including the steps of selecting first and second caps each of which has a T extension from its incisal the width of which extends past the margin of the respective cap in both directions and placing said caps on said first and second teeth, selecting a third like cap and inserting it in the space between said first and second caps, so that the extensions of the T of said third cap respectively overlap extensions of the T's of said first and second caps, bringing the overlapping extensions together into contact and welding said extensions together in the mouth, removing said caps from the mouth and welding at contact points between caps, smoothing said extensions and thereafter cementing said first and second caps respectively to said first and second teeth.

3. An intra-oral process for the preparation of a brace to extend between first and second teeth including the steps of selecting first and second bands each of which has a projecting shelf formed thereon and placing said bands on said first and second teeth respectively with said shelves projecting outwardly from the mouth, placing first and second buccal tubes on the shelves of said first and second bands respectively and welding said tubes to said shelves in the mouth, placing an arch wire in said buccal tubes and properly positioning the same by bending said shelves, removing said arch wire and said bands from the mouth and further cementing the bands to said first and second teeth respectively.

4. An intra-oral process for the treatment of teeth including the steps of preparing the tooth for receipt of a first appliance, selecting a second appliance which is compatible with said first appliance and attaching said second appliance to said first appliance by welding in the mouth.

* * * * *